United States Patent
Tanaka et al.

(10) Patent No.: US 9,412,056 B1
(45) Date of Patent: Aug. 9, 2016

(54) IMAGE FORMING APPARATUS PERFORMING IMAGE QUALITY ADJUSTMENT BASED ON PERIOD IMAGE FORMING ASSEMBLY UNLOADED AND FORMING FINAL IMAGE WHILE IMAGE FORMING ASSEMBLY REPLACED

(71) Applicant: FUJI XEROX CO., LTD., Tokyo (JP)

(72) Inventors: Satoshi Tanaka, Kanagawa (JP); Junichi Ishibashi, Kanagawa (JP); Yuki Sekura, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/790,050

(22) Filed: Jul. 2, 2015

(30) Foreign Application Priority Data

Jan. 16, 2015 (JP) ................................. 2015-006309

(51) Int. Cl.
| | |
|---|---|
| G06K 15/02 | (2006.01) |
| H04N 1/50 | (2006.01) |
| H04N 1/60 | (2006.01) |
| H04N 1/23 | (2006.01) |
| G06F 3/12 | (2006.01) |
| H04N 1/00 | (2006.01) |
| G06K 15/00 | (2006.01) |

(52) U.S. Cl.
CPC .......... *G06K 15/1878* (2013.01); *G06F 3/1208* (2013.01); *G06F 3/1255* (2013.01); *G06F 3/1293* (2013.01); *G06F 3/1297* (2013.01); *G06K 15/1805* (2013.01); *G06K 15/1822* (2013.01); *G06K 15/407* (2013.01); *H04N 1/0005* (2013.01); *H04N 1/00023* (2013.01); *H04N 1/00037* (2013.01); *H04N 1/00082* (2013.01); *H04N 1/2338* (2013.01); *H04N 1/2346* (2013.01); *H04N 1/2376* (2013.01); *H04N 1/2392* (2013.01); *H04N 1/50* (2013.01); *H04N 1/506* (2013.01); *H04N 1/603* (2013.01); *H04N 1/6008* (2013.01); *G03G 2221/1892* (2013.01)

(58) Field of Classification Search
None
See application file for complete search history.

(56) References Cited

U.S. PATENT DOCUMENTS

| | | | | |
|---|---|---|---|---|
| 7,570,892 B2 * | 8/2009 | Nakazato | ........... | G03G 21/1839 399/13 |
| 8,416,452 B2 * | 4/2013 | Ogihara | ............. | G03G 15/0121 358/1.14 |

FOREIGN PATENT DOCUMENTS

| | | |
|---|---|---|
| JP | 5-301382 A | 11/1993 |
| JP | 2006-163054 A | 6/2006 |

* cited by examiner

*Primary Examiner* — Scott A Rogers
(74) *Attorney, Agent, or Firm* — Sughrue Mion, PLLC

(57) ABSTRACT

An image forming apparatus includes individually replaceable image forming assemblies forming images of different colors; a storage portion that stores time when at least one image forming assembly currently loaded into the apparatus is unloaded; a calculating portion that calculates an unloaded-engine storage period, time elapsed from when a newly loaded image forming assembly is unloaded last time to when the image forming assembly is newly loaded; and a controller that performs image quality adjustment depending on the unloaded-engine storage period calculated before the newly loaded image forming assembly is used for image formation. The apparatus receives image data of an image that contains a color other than colors that currently loaded image forming assemblies form. The apparatus forms a final image based on the image data on a sheet through image forming operations on the same sheet while at least one of the loaded image forming assemblies is replaced.

4 Claims, 7 Drawing Sheets

FIG. 5

TEMPORARILY STOPPED DUE TO LACK OF SPOT-COLOR PRINTING COMMAND.
FOR SPOT-COLOR PRINTING, RETRANSMIT IMAGE DATA AND INSTRUCT TO PERFORM SPOT-COLOR PRINTING.

FIG. 6

PROCEDURE IS TERMINATED DUE TO INCOMPLETE ENGINE REPLACEMENT.

FIG. 7

REPLACE G ENGINE WITH K ENGINE.

FIG. 8

REPLACE TWO OF CURRENTLY LOADED
ENGINES WITH G ENGINE AND O ENGINE.

FIG. 9

T ENGINE IS LOADED.
REPLACE T ENGINE WITH K ENGINE.

FIG. 10

LOAD O ENGINE.

IMAGE FORMING APPARATUS PERFORMING IMAGE QUALITY ADJUSTMENT BASED ON PERIOD IMAGE FORMING ASSEMBLY UNLOADED AND FORMING FINAL IMAGE WHILE IMAGE FORMING ASSEMBLY REPLACED

CROSS-REFERENCE TO RELATED APPLICATIONS

This application is based on and claims priority under 35 USC 119 from Japanese Patent Application No. 2015-006309 filed Jan. 16, 2015.

BACKGROUND

Technical Field

The present invention relates to image forming apparatuses.

SUMMARY

According to an aspect, an image forming apparatus includes multiple individually replaceable image forming assemblies forming images of different colors, a storage portion that stores a time point at which at least one of image forming assemblies currently loaded into the apparatus is unloaded, a calculating portion that calculates an unloaded-engine storage period, which is time elapsed from a time point at which a newly loaded image forming assembly is unloaded last time to a time point at which the image forming assembly is newly loaded, and a controller that performs image quality adjustment depending on the unloaded-engine storage period calculated by the calculating portion before the newly loaded image forming assembly is used for image formation. The apparatus receives an input of image data of an image that contains a color other than colors that currently loaded image forming assemblies form. The apparatus forms a final image based on the image data on a sheet through a plurality of image forming operations on the same sheet while at least one of the image forming assemblies loaded into the apparatus is replaced.

BRIEF DESCRIPTION OF THE DRAWINGS

Exemplary embodiments of the present invention will be described in detail based on the following figures, wherein:

FIG. 5 illustrates an example of an error message;

FIG. 6 illustrates another example of an error message;

FIG. 7 illustrates an example of an engine replacement message;

FIG. 8 illustrates another example of an engine replacement message;

FIG. 9 illustrates another example of an engine replacement message;

FIG. 10 illustrates another example of an engine replacement message; and

DETAILED DESCRIPTION

Exemplary embodiments of the invention are described below.

Figure 1:
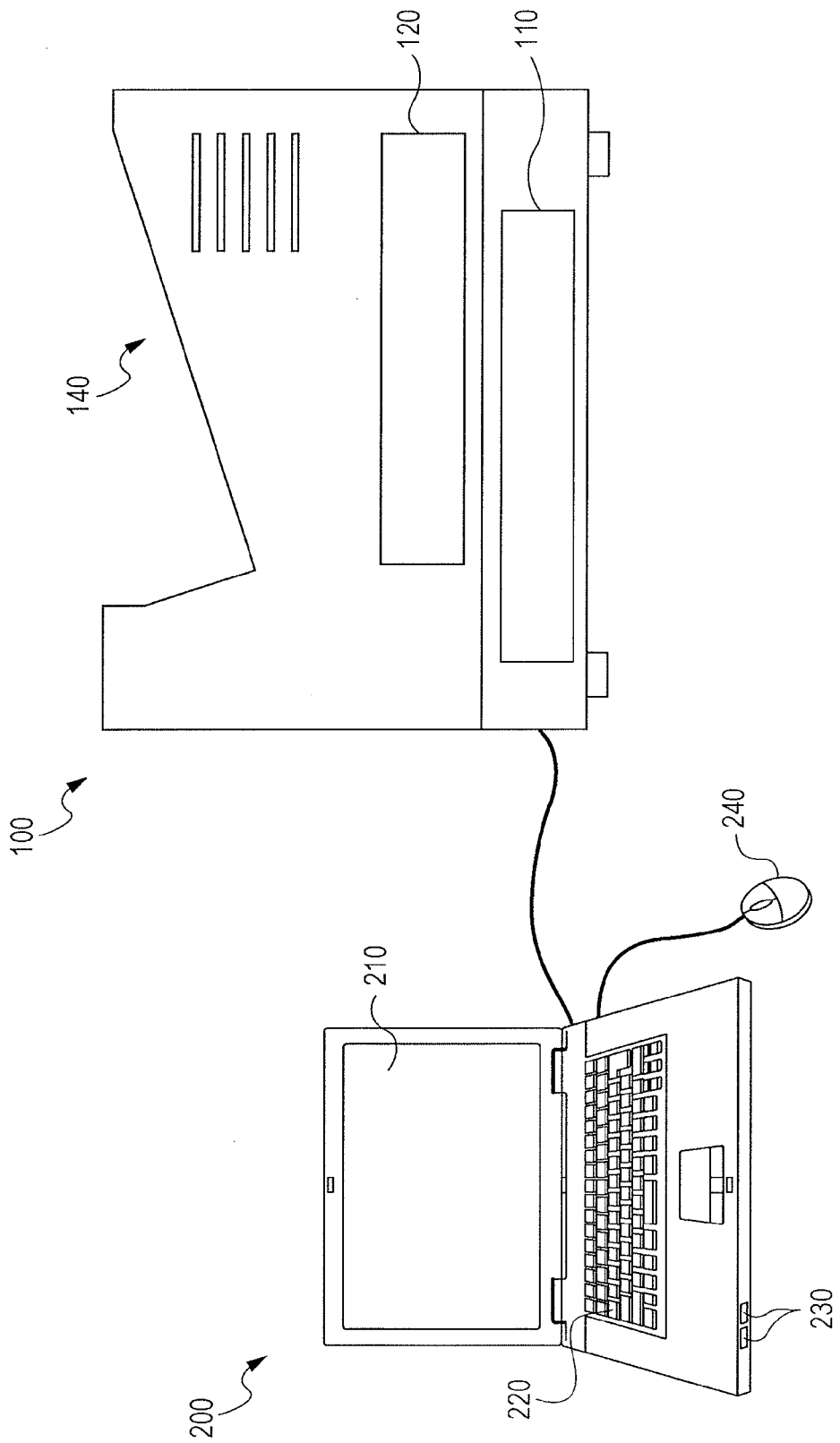
FIG. 1 is a schematic diagram of the external appearance of a printer.

FIG. 1 is a schematic diagram of the external appearance of a printer 100. The printer 100 is an exemplary embodiment of an image forming apparatus. A notebook personal computer (abbreviated to "notebook PC", below) 200 is connected to the printer 100.

The printer 100 includes a drawer-type sheet tray 110 at a lower portion. This sheet tray 110 contains a stack of multiple sheets for printing.

The printer 100 includes a drawer-type engine loading frame 120 at a portion above the sheet tray 110. Four image forming engines 130 (see FIG. 2) are loaded onto the engine loading frame 120. These four image forming engines 130 are individually loadable onto or unloadable from the engine loading frame 120. These engines correspond to examples of image forming assemblies.

The printer 100 also includes a paper exit tray unit 140, onto which sheets on which images have been printed are ejected, at an upper portion. The paper exit tray unit 140 has a two-level configuration. An upper-level tray 141, which is a movable paper exit tray (see FIG. 2), also serves as a paper supply tray that supplies a sheet subjected to a first printing into the printer 100 so as to subject the same sheet to a second printing (subsequent printing). The paper exit tray unit 140 is described in detail below.

The notebook PC 200 illustrated in FIG. 1 has a function of transmitting image data to the printer 100 and also has a function as a user interface (UI) of the printer 100.

The notebook PC 200 includes a display screen 210, a keyboard 220, multiple memory slots 230, and a mouse 240.

The display screen 210 displays various types of information related to the printer 100. The keyboard 220 and the mouse 240 are tools operated by users for inputting various commands to the printer 100. The memory slots 230 are provided to allow various types of external memories, including a memory card and a USB memory, to be attached thereto. An external memory storing image data based on which an image is printed is attached to one of the memory slots. The image data is read from the external memory by the notebook PC and then transmitted to the printer 100. The printer 100 prints an image based on the transmitted image data on a sheet taken out from the sheet tray 110 and then ejects the sheet to the paper exit tray unit 140. In some cases, the printer 100 receives, from the notebook PC 200, image data of an image containing colors, such as five or six colors, the number of which is larger than the number of colors in images formed by the image forming engines 130 loaded into the printer 100. The operation in such a case is described in detail below.

Figure 2:
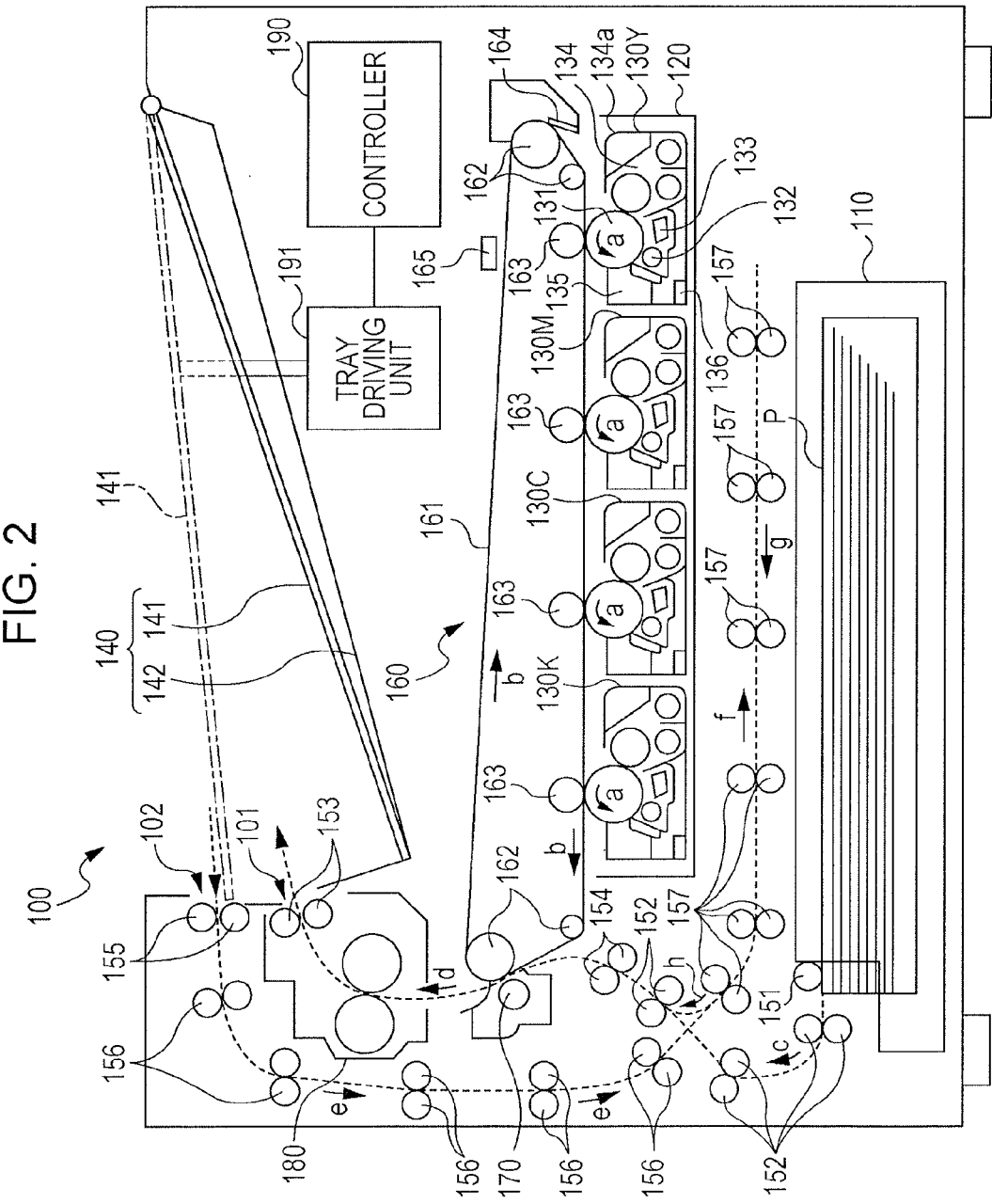
FIG. 2 is an inner configuration diagram of the printer whose external appearance is illustrated in FIG. 1.

FIG. 2 is an internal configuration diagram of a printer whose external appearance is illustrated in FIG. 1.

The printer 100 has the drawer-type sheet tray 110 at a lower portion. The sheet tray 110 contains a stack of unused sheets P for printing. The sheets P in the sheet tray 110 are picked up one by one by a pick-up roller 151 for image printing and transported by transporting rollers 152. Sheet transportation is described in detail below.

The printer 100 also has the drawer-type engine loading frame 120. Four image forming engines 130 are loaded onto the engine loading frame 120. These four image forming engines 130 are in the form of a cartridge and individually loadable onto or unloadable from the engine loading frame 120. The image forming engines 130 each contain a single color toner. Each image forming engine 130 forms a single-color-toner image using the corresponding single color toner.

Here, when the color of each of the image forming engines 130 is to be specified, the image forming engine 130 is denoted by a symbol '130', which represents an image forming engine, with the suffix of a character, such as 'Y' (denoting yellow), 'M' (denoting magenta), 'C' (denoting cyan), or 'K' (denoting black), for expressing the corresponding color of a toner. Although not illustrated here, the printer 100 is also ready to accept three image forming engines that contain toners of 'G' (denoting green), 'O' (denoting orange), and 'T' (denoting transparent).

In the exemplary embodiment, all the image forming engines 130 have the same configuration. Each image forming engine 130 includes a photoconductor 131, which rotates in a direction of arrow a, a charging device 132, an exposing device 133, a developing device 134, and a cleaner 135, which are disposed around the photoconductor 131.

The charging device 132 uniformly charges the surface of the corresponding photoconductor 131.

The exposing device 133 applies exposure light modulated on the basis of the image data to the corresponding photoconductor 131 to form an electrostatic latent image on the photoconductor 131. Each image forming engine 130 receives image data indicating a single-color image that is to be formed with a color toner corresponding to the image forming engine 130. The exposing device 133 applies, to the photoconductor 131, exposure light modulated on the basis of the image data indicating the single color image. Thus, the exposing device 133 forms an electrostatic latent image representing the single color image on the photoconductor 131.

The developing device 134 develops the electrostatic latent image formed on the corresponding photoconductor 131 with a toner to form a single-color-toner image on the photoconductor 131. The developing device 134 includes a toner cartridge 134a. The toner cartridge 134a contains a single-color toner corresponding to the developing device 134. The toner in the toner cartridge 134a is supplied into the corresponding developing device 134 for forming a toner image. The toner cartridges 134a are individually replaceable. When a toner in one toner cartridge 134a is used up, the toner cartridge 134a is replaced with a new one.

An intermediate transfer unit 160 is disposed above the image forming engines 130. The intermediate transfer unit 160 includes an endless intermediate transfer belt 161, multiple support rollers 162 that support the intermediate transfer belt 161, four first transfer rollers 163, a cleaner 164, and a sensor 165.

The intermediate transfer belt 161 is supported by the multiple support rollers 162 and rotates in the direction of arrow b through a traveling path along the four image forming engines 130.

The four first transfer rollers 163 are disposed at positions opposing the photoconductors 131 of the respective image forming engines 130 with the intermediate transfer belt 161 interposed therebetween. The first transfer rollers 163 transfer the toner images formed on the respective photoconductors 131 to the surface of the intermediate transfer belt 161.

Toner images formed on the photoconductors 131 of the respective four image forming engines 130 are sequentially transferred in a superposed manner to the intermediate transfer belt 161, moving in the direction of arrow b, by the operations of the respective first transfer rollers 163.

After the toner images are transferred to the intermediate transfer belt 161, remnants such as toners remaining on the surfaces of the photoconductors 131 are removed by the corresponding cleaners 135.

Each image forming engine 130 also includes a memory 136. The memory 136 stores various types of information relating to the image forming engine 130 such as the color of a toner used in the image forming engine 130 or the accumulated used hours. When one image forming engine 130 is loaded onto the engine loading frame 120 and the engine loading frame 120 is attached to the printer 100, the printer 100 reads the content of the memory 136 or, when needed, rewrites the content of the memory 136.

The toner images sequentially transferred to the intermediate transfer belt 161 in a superposed manner are transferred by the operation of a second transfer roller 170 to a sheet P that has been transported to the position of the second transfer roller 170 at a right timing. The sheet P subjected to the toner image transfer is heated and pressed by a fixing device 180, so that an image constituted by the fixed toner images is printed on the sheet P. The sheet P is then ejected by paper exit rollers 153 to the paper exit tray unit 140 through a paper outlet port 101.

After the toner image transfer, remnants such as toners remaining on the surface of the intermediate transfer belt 161 are removed by the cleaner 164.

The paper exit tray unit 140 has a two-level configuration including a movable paper exit tray 141 and a fixed paper exit tray 142 under the movable paper exit tray 141. The movable paper exit tray 141 is movable between a paper receiving position, drawn with solid lines in FIG. 2, and a paper supplying position, drawn with a dot-dash line in FIG. 2. The movable paper exit tray 141 is moved between the paper receiving position and the paper supplying position by a tray driving unit 191 controlled by a controller 190. When receiving a sheet P on which an image has been printed, the movable paper exit tray 141 is moved to the paper receiving position, drawn with solid lines, to receive the sheet P. The printer 100 occasionally performs printing on the same sheet twice, as will be described below. In a second printing, while the paper exit tray 141 carries the sheet P that has been ejected thereto after the completion of a first printing, the paper exit tray 141 moves to the paper supplying position, drawn with a dot-dash line. The sheet P on the paper exit tray unit 140 that has arrived at the paper supplying position is fed again to the printer 100 through a paper supply port 102 for the second printing.

Now, the transportation path along which sheets are transported for printing is described.

For a first printing, a sheet P is picked up by the pick-up roller 151 from the sheet tray 110 and transported by the transporting rollers 152 in the direction of arrow c until the leading edge of the sheet P arrives at registration rollers 154. Thereafter, the sheet P is fed by the registration rollers 154 to the position of the second transfer roller 170 in such a manner that the sheet P arrives at the position at the same time as the toner images transferred to the intermediate transfer belt 161 arrive at the position of the second transfer roller 170. Then, the toner images are transferred to the sheet P by the operation of the second transfer roller 170. The sheet P to which the toner images have been transferred is transported further in the direction of arrow d. The toner images are fixed to the sheet P by the fixing device 180 and the sheet P is ejected to the paper exit tray 141 by the paper exit rollers 153.

For a second printing on the same sheet, the engine loading frame 120 is then drawn out so that the image forming engines 130 are replaced. When a reprint command is subsequently transmitted from the notebook PC 200 (see FIG. 1), the paper exit tray 141 is raised by the tray driving unit 191 to the paper supplying position, drawn with a dot-dash line. Then, the sheet P that has been temporarily ejected to the paper exit tray 141 is drawn into the printer 100 through the paper supply port 102 by paper supplying rollers 155.

The sheet P that has been drawn into the printer 100 is transported by transporting rollers 156 in the direction of arrow e and then by transporting rollers 157 in the direction of arrow f.

After the sheet P is transported by the transporting rollers 157 in the direction of arrow f, the transporting rollers 157 start rotating reversely, so that the sheet P is then transported in the direction of arrow g by the transporting rollers 157. The sheet P that has been transported in the direction of arrow g is then transported in the direction of arrow h until the leading edge of the sheet P arrives at the registration rollers 154. The following process is performed in the same manner as in the first printing and the sheet P subjected to the second printing (subsequent printing) is ejected to the fixed paper exit tray 142.

In FIG. 2, the controller 190 of the printer 100 is connected to only the tray driving unit 191. However, besides the tray driving unit 191, the controller 190 controls the entirety of the printer 100, including the processing described below.

The printer 100 performs image quality adjustment. For this image quality adjustment, one or more image forming engines 130 form image-quality-adjustment toner images (toner patches) and transfer the toner images (toner patches) to the intermediate transfer belt 161. The toner images (toner patches) are measured by the sensor 165 without the second transfer roller 170 transferring the toner images to a sheet P. In accordance with the results of measurement performed by the sensor 165, the controller 190 performs image quality adjustment such as registration between single-color-toner images or tone correction of toner images.

This printer 100 changes image forming conditions, including the transfer bias potential applied to the second transfer roller 170 or the heating temperature at the fixing device 180, depending on the conditions for performing a subsequent printing. The image forming conditions are so changed as to print out a high quality image in accordance with the water content contained in the sheet P or the temperature of the sheet P that varies with time elapsed from the completion of a first printing on the sheet P.

The printing operation of the printer 100 involving a subsequent printing illustrated in FIGS. 1 and 2 is further described below.

Figure 3:
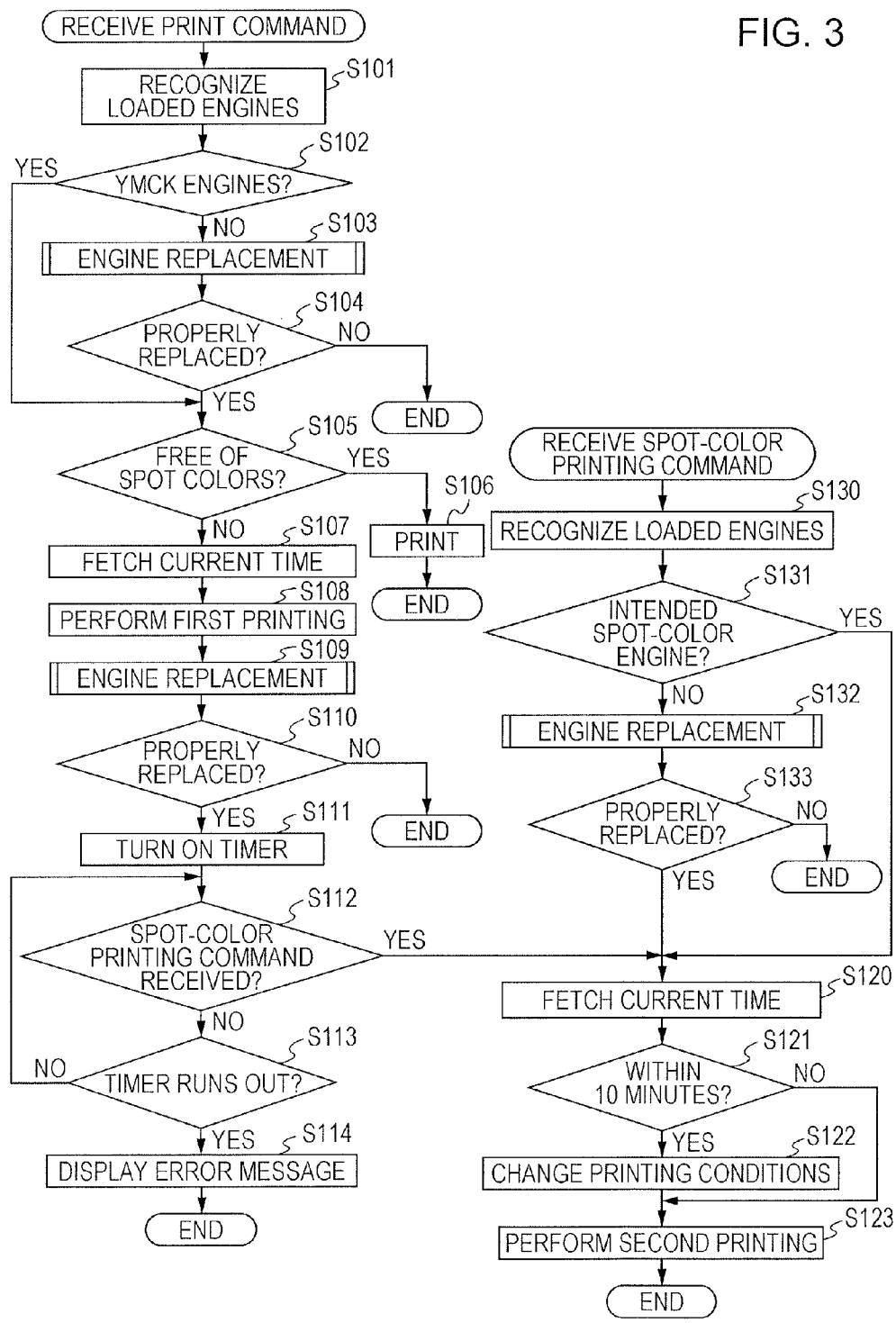
FIG. 3 is a flowchart of a printing operation.

FIG. 3 is a flowchart of a printing operation.

Figure 4:
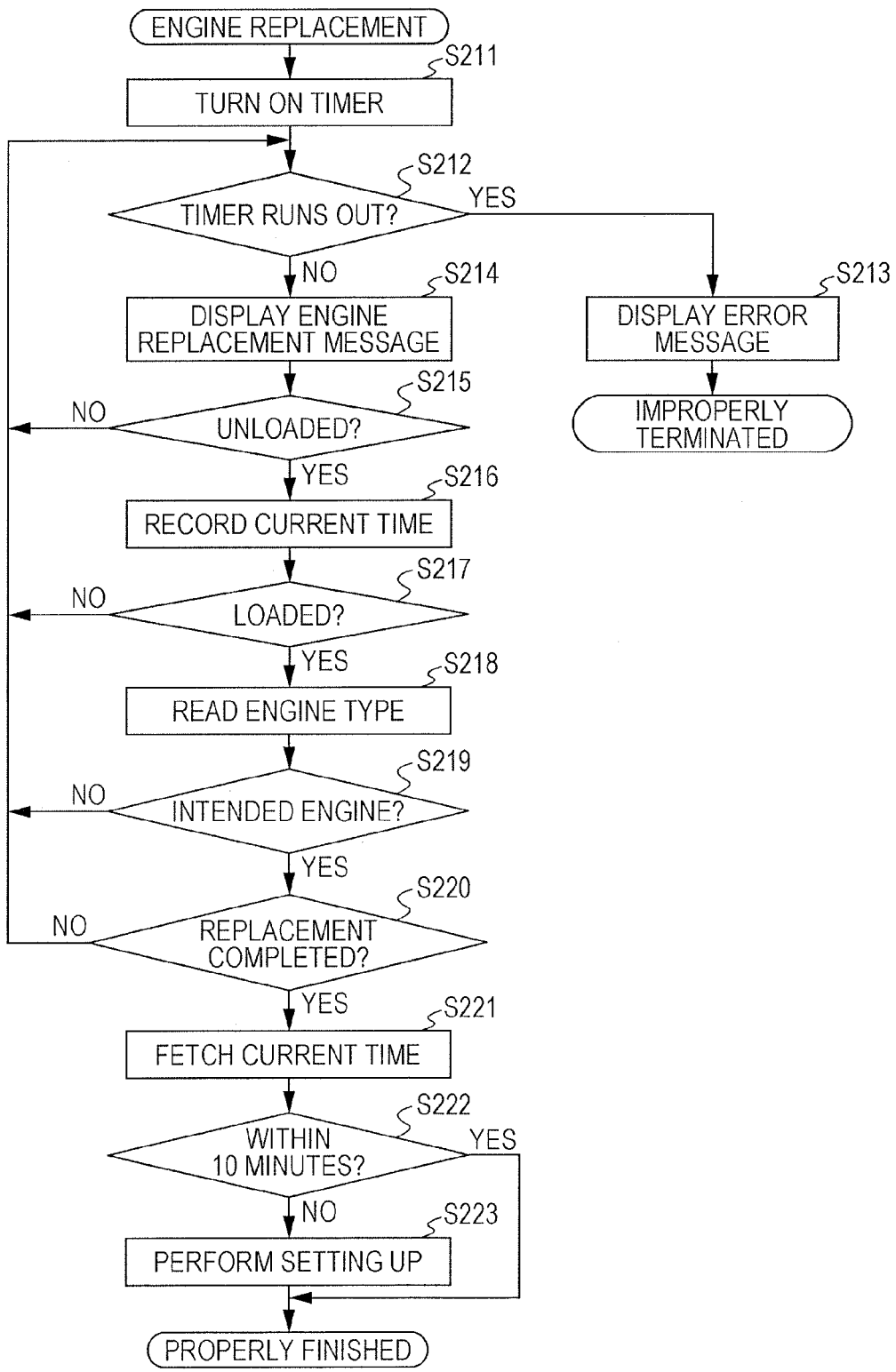
FIG. 4 is a flowchart of an engine replacement.

FIG. 4 is a flowchart of engine replacement performed several times in the printing operation illustrated in FIG. 3.

The printer 100 is capable of receiving, from the notebook PC 200, multicolor image data indicating images containing colors, the number of which is larger than the number of colors in images formed by the image forming engines 130 (four image forming engines 130, here) concurrently loadable into the printer 100. The printer 100 is also capable of printing out an image based on the multicolor image data.

When the printer 100 receives from the notebook PC 200 image data and a command of printing an image based on the image data, the printer 100 firstly recognizes the types (colors of toners) of image forming engines 130 newly loaded into the printer 100 (Step S101).

Here, the image forming engines are described while colors of their toners are distinguished by adding the prefixes (for example, 'Y' for yellow) denoting the colors of toners to the term "engine". For example, the image forming engine that forms toner images with a yellow (Y) toner is referred to as a "Y engine 130Y". The image forming engines that form toner images with toners of all the colors Y, M, C, and K are collectively referred to as "YMCK engines 130Y, 130M, 130C, and 130K".

When the currently loaded image forming engines 130 include at least one engine other than the YMCK engines 130Y, 130M, 130C, and 130K, engine replacement (Step S103) is performed.

When the currently loaded engines are the YMCK engines 130Y, 130M, 130C, and 130K (Step S102) or when engine replacement (Step S103) to the YMCK engines 130Y, 130M, 130C, and 130K has been properly performed (Step S104), the printer 100 determines whether the image data for which a printing command is issued involves the use of at least one color other than the YMCK colors (here, the color other than the YMCK colors is referred to as a "spot color") (Step S105). When the printer 100 determines that the image data for which a printing command is issued does not involve the use of a spot color and that the printer 100 is capable of printing out a complete image with toners of YMCK colors, an image based on the image data is printed out on a sheet P (Step S106) and the process started in response to the current printing command is finished.

On the other hand, when the printer 100 determines in Step S105 that the image data involves the use of a spot color, the printer 100 fetches the current time (Step S107) and then performs a first printing (Step S108). Thereafter, engine replacement is performed (Step S109). When engine replacement is not properly performed, the printing operation is finished. When, on the other hand, engine replacement is properly performed (Step S110), a timer is turned on to start keeping time (Step S111) and the printer 100 starts waiting for a spot-color printing command (Step S112). The timer that starts keeping time in Step S111 is a timer that keeps the maximum standby time for which a spot-color printing command is waited for. This spot-color printing command is issued by an operation of the notebook PC 200. However, provided that the printer 100 determines in Step S110 that engine replacement has been properly performed, the printer 100 may proceed to a spot-color printing operation without the need for waiting for a command from a user.

When the timer runs out without receiving a spot-color printing command (Step S113), an error message is displayed on a display screen 201 of the notebook PC 200 (Step S114) and this printing operation routine is finished without performing a spot-color printing.

FIG. 5 illustrates an example of an error message displayed in Step S114.

Here, the display screen 201 of the notebook PC 200 displays "Temporarily stopped due to lack of spot-color printing command. For spot-color printing, retransmit image data and instruct to perform spot-color printing".

When the image data is retransmitted later and a command instructing to perform a spot-color printing is transmitted in the manner as instructed on the display illustrated in FIG. 5, the printing operation illustrated in FIG. 3 is resumed from the step of "spot-color printing command".

Upon receipt of a spot-color printing command, the printer 100 firstly recognizes the types of image forming engines 130 currently loaded into the printer 100 (Step S130), as in the case of Step S101. The printer 100 then determines whether a spot-color engine corresponding to a spot color used in the current image data is loaded into the printer 100 (Step S131). When the printer 100 determines that the intended engine corresponding to the spot color is not loaded into the printer 100, engine replacement is performed (Step S132). Thereafter, the printer 100 determines whether the engine replacement has been properly performed (Step S133).

When the printer 100 receives a spot-color printing command before the timer runs out (Step S112), when the printer 100 determines in Step S131 that the intended spot-color engine has been loaded into the printer 100, or when the replacement with the intended spot-color engine has been properly performed (Steps S132 and S133), the printer 100 proceeds to the spot-color printing operation from Step S120 onward.

Here, the printer 100 firstly fetches the current time (Step S120) and determines whether the time elapsed from the time before the first printing fetched in Step S107 falls within ten minutes (Step S121). Here, the elapsed time in Step S121 corresponds to an example of an "intermediate-image storage period".

When the printer 100 determines in Step S121 that the elapsed time exceeds ten minutes, the second printing using a spot-color engine is performed under the normal printing conditions, that is, the same printing conditions as those for the first printing.

On the other hand, when the printer 100 determines in Step S121 that the elapsed time falls within ten minutes, the second printing is performed after the printing conditions are changed (Step S122).

When the elapsed time falls within ten minutes, the sheet P retains the residual heat and the water content of the sheet P has been changed as a result of the sheet P being heated by the fixing device 180 during the first printing. Thus, in this case, the transfer bias of the second transfer roller 170 is lowered and the heating temperature at the fixing device 180 is lowered. With such adjustment, a higher quality image is printed out.

Here, the printer 100 determines whether the printing conditions are to be changed depending on whether the elapsed time falls within ten minutes. However, the printing conditions may be changed at multiple stages or consecutively using a function of the elapsed time. Alternatively, the printing conditions may be changed in consideration of factors such as the thickness (basis weight) of the sheet or the environmental temperature or humidity.

When the second printing is finished (Step S123), the printing operation is complete.

Now, engine replacement illustrated in FIG. 4 is described. The engine replacement is performed in Steps S103, S109, and S132 in the printing operation illustrated in FIG. 3.

In engine replacement, firstly, a timer is turned on to start keeping time (Step S211). This timer is used to keep the maximum standby time for waiting for the completion of engine replacement.

In Step S212, the printer 100 determines whether the timer that has been turned on in Step S211 has run out. The procedure occasionally returns to Step S212 from multiple determination steps described below (Steps S215, S217, S219, and S220) and the time until the completion of replacement is continuously measured. When the printer 100 determines in Step S212 that the timer has run out, an error message is displayed on the display screen of the notebook PC 200 (Step S213) and the procedure returns to the printing operation illustrated in FIG. 3.

FIG. 6 illustrates an example of an error message displayed in Step S213.

Here, the display screen of the notebook PC 200 displays "Procedure is terminated due to incomplete engine replacement".

When the procedure is returned to the printing operation after this error message is displayed, the printer 100 determines that the engine replacement has been improperly finished (Steps S104, S110, and S133 in FIG. 3) and the printing operation is finished.

When the timer has not yet run out, the procedure proceeds to Step S214 and an engine replacement message is displayed on the display screen of the notebook PC 200.

FIG. 7 illustrates an example of the engine replacement message.

The engine replacement message illustrated in FIG. 7 is "Replace G engine with K engine". This engine replacement message is an example for the engine replacement illustrated in FIG. 4 is to be performed as Step S103 of FIG. 3 and the printer 100 determines in Step S101 that a G engine 130G has been loaded instead of a K engine 130K.

FIG. 8 is another example of an engine replacement message.

The engine replacement message illustrated in FIG. 8 is "Replace two of currently loaded engines with G engine and O engine". This engine replacement message is an example where the engine replacement is to be performed as Step S109 of FIG. 3, four YMCK engines 130Y, 130M, 130C, and 130K are newly loaded, and the subsequent printing involves the use of spot colors of green (G) and orange (O).

The message illustrated in FIG. 8 allows any two of the currently loaded four YMCK engines 130Y, 130M, 130C, and 130K to be replaced with spot-color engines. Instead, the position of each spot-color engine at which the engine is loaded may be fixed, for example, a G engine 130G is always replaced with a Y engine 130Y and an O engine 1300 is always replaced with an M engine 130M.

As illustrated in FIGS. 7 and 8, the engine replacement message displayed in Step S214 varies depending on the situation at each replacement.

In Step S215, the printer 100 monitors whether the loaded engine has been unloaded and, when the loaded engine has been unloaded, the printer 100 records the time point of unloading in association with the unloaded engine (Step S216). Then, the printer 100 monitors whether a new engine is loaded (Step S217) and, when the printer 100 determines that a new engine has been loaded, the printer 100 reads the type (ID) of the loaded engine from the memory 136 (see FIG. 2) of the loaded engine (Step S218). Thereafter, the printer 100 determines whether the loaded engine is an intended engine (Step S219). When the newly loaded engine is different from the intended engine, the procedure returns to Step S214.

FIG. 9 illustrates an example of an engine replacement message displayed when the procedure returns to Step S214 from Step S219.

The engine replacement message illustrated in FIG. 9 is "T engine is loaded. Replace T engine with K engine". This message is displayed in the case where a T engine 130T is erroneously loaded instead of a K engine 130K while the message "Replace G engine with K engine" illustrated in FIG. 7 has been displayed in Step S214 of FIG. 4.

When the printer 100 determines in Step S219 that an intended engine has been loaded, the printer 100 subsequently determines whether replacement has been finished (Step S220).

FIG. 10 illustrates an example of an engine replacement message displayed when the procedure returns from Step S220 to Step S214.

The engine replacement message illustrated in FIG. 10 is "Load O engine". This message is displayed in the case, for example, where a G engine 130G has been loaded but an O engine 1300 remains unloaded while the message "Replace any two of newly loaded engines with G engine and O engine" illustrated in FIG. 8 has been displayed.

Then, when the printer 100 determines in Step S220 that all the engines that have to be replaced with other engines have been completely replaced, the printer 100 fetches the time point of the completion (Step S221). Then, the printer 100 determines whether the time elapsed from the time when the newly loaded engine is unloaded last time (time recorded in association with the engine in Step S216) to the current time fetched in Step S221 falls within ten minutes (Step S222). The elapsed time is an example of an unloaded-engine storage period.

When the elapsed time exceeds ten minutes, the loaded engine is set up (Step S223). Specifically, the engine is caused to form a toner patch on the intermediate transfer belt 161, the toner patch is measured by the sensor 165, and appropriate image quality adjustment such as registration between colors or tone correction is performed. The image quality adjustment is performed on only an engine newly loaded during the current replacement and that has been unloaded for more than ten minutes from the last unloading. Thus, toner consumption for setting up engines is minimized and the time for setting up engines is also minimized.

When the engine is completely set up in this manner (Step S223) or setting up of the engine reloaded within ten minutes is omitted (Step S222), the engine replacement is properly finished and the procedure returns to the printing operation illustrated in FIG. 3.

In this manner, in this exemplary embodiment, the image forming conditions are changed depending on the elapsed time between the first printing and the second printing. In addition, the engine is set up depending on the period for which the engine is stored after unloading. Thus, a high quality image is printed out even when a sheet is subjected to printing multiple times while engine replacement is performed.

Setting up (image quality adjustment) of an engine that is performed in response to engine replacement has been described thus far. However, image quality adjustment is also performed periodically or in response to other conditional changes. Such image quality adjustment is performed in the same manner as in the existing technology and thus the illustration or description of such image quality adjustment is omitted here.

Figure 11:
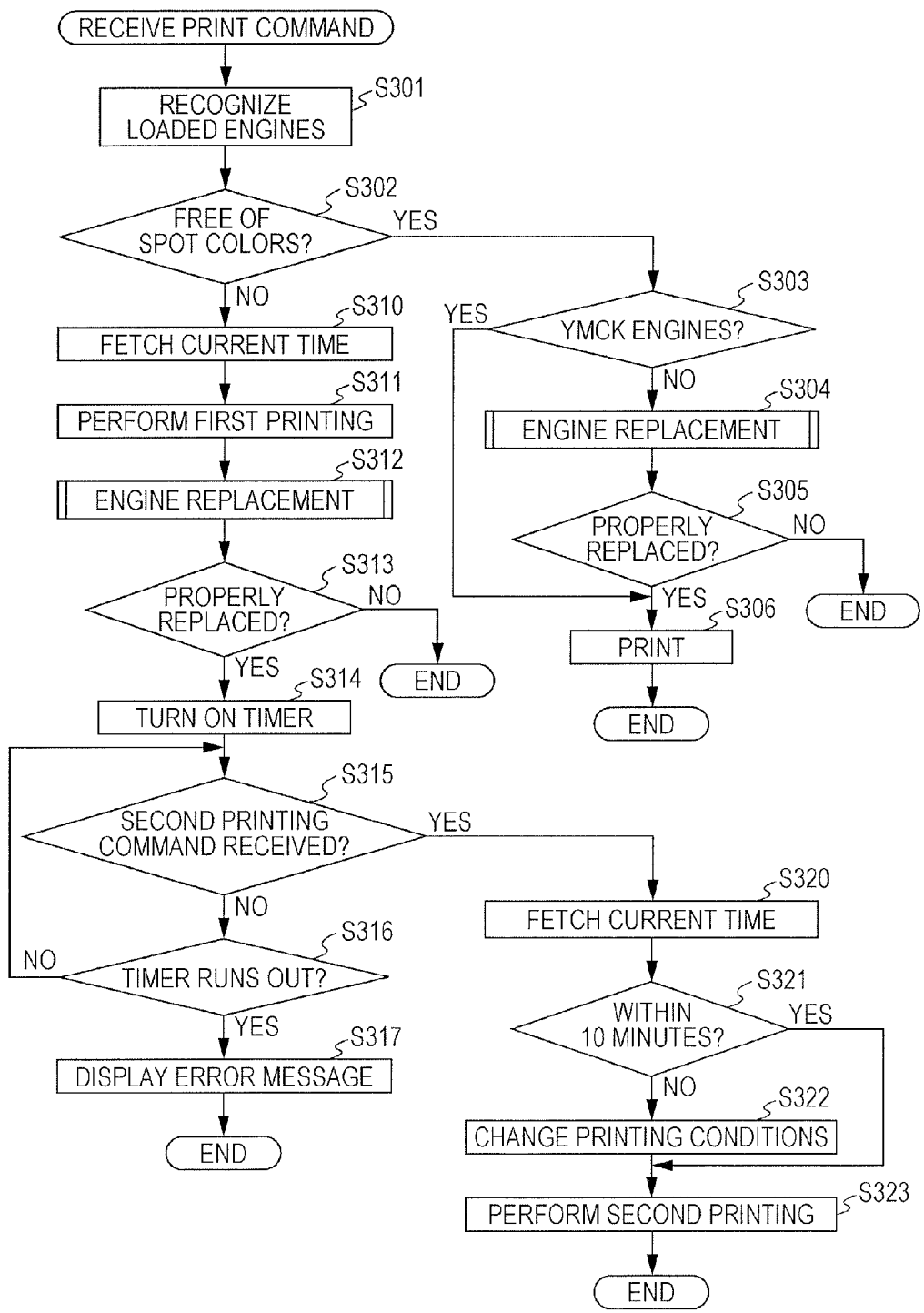
FIG. 11 is a flowchart of another example of a printing operation different from the operation illustrated in FIG. 3.

FIG. 11 illustrates a flowchart of another example of a printing operation, which is different from the printing operation illustrated in FIG. 3.

In sequence of the flowchart illustrated in FIG. 3, the YMCK engines 130Y, 130M, 130C, and 130K have to be always loaded for the first printing and spot-color engines are used in the second printing. On the other hand, in the printing operation illustrated in FIG. 11, in the case where the printer 100 is loaded with a spot-color engine at the time when the printer 100 receives a printing command involving the use of the corresponding spot color, the printer 100 performs a spot-color printing first.

Upon receipt of a printing command, the printer 100 firstly recognizes the engines newly loaded into the printer 100 (Step S301). Then, the printer 100 determines whether image data based on which an image is printed this time involves the use of a spot color (Step S302). When the printer 100 determines that the image data does not involve the use of a spot color (Step S302) and the currently loaded engines do not constitute a combination of the YMCK engines 130Y, 130M, 130C, and 130K (Step S303), engine replacement is performed so that the currently loaded engines constitute the YMCK engines 130Y, 130M, 130C, and 130K (Step S304). When the engines are properly replaced (Step S305), the printer 100 starts printing. When the YMCK engines 130Y, 130M, 130C, and 130K have already been loaded (Step S303), engine replacement is omitted and the printer 100 starts printing (Step S306).

When the image data based on which an image is printed this time involves the use of a spot color (Step S302), the printer 100 fetches the current time (Step S310) and starts the first printing without engine replacement (Step S311). Specifically, when the YMCK engines 130Y, 130M, 130C, and 130K have already been loaded at the time point of Step S302, the first printing is performed using the YMCK engines 130Y, 130M, 130C, and 130K. When a spot-color engine is included in the loaded engines, the first printing is performed using the loaded spot-color engine and the loaded ones of the YMCK engines 130Y, 130M, 130C, and 130K. However, when all the spot-color engines that are to be used (for example, the G engine 130G and the O engine 130O) have been loaded, a first printing may be performed using only the spot-color engines and the use of the YMCK engines 130Y, 130M, 130C, and 130K for printing images with the Y, M, C, and K colors may be postponed for a second printing. After the first printing is performed, engine replacement is performed (Step S312). Here, the engines are replaced with remaining engines that have not been loaded at the time of the first printing among all the engines required for this printing.

The following steps S313 to S323 are the same as the steps S110 to S123 of the procedure illustrated in FIG. 3 and thus are not redundantly described.

In the printing operation illustrated in FIG. 11, transmission of a second printing command after a while is prohibited. In the printing operation illustrated in FIG. 3, it is known that the first printing is performed using the YMCK engines 130Y, 130M, 130C, and 130K and that the second printing is to be performed using a spot color. On the other hand, in the printing operation illustrated in FIG. 11, engines used in the first printing are not fixed to the YMCK engines 130Y, 130M, 130C, and 130K. Thus, which engines are to be used in the second printing are uncertain if a second printing command is received after a while.

In the case where engines used in the first printing are fixed to the YMCK engines 130Y, 130M, 130C, and 130K, the order in which color toners are superposed is determined in advance. In this case, image quality adjustment is relatively easy and a high quality image is obtained. However, the case where engines used in the first printing are fixed to the YMCK engines 130Y, 130M, 130C, and 130K is disadvantageous in that a user has to replace a spot-color engine, if already loaded by a previous user, with a missing one of the YMCK engines 130Y, 130M, 130C, and 130K before the first printing and then to load the spot-color engine again after the first printing.

On the other hand, performing a first printing using a spot-color engine, if already loaded, dispenses with the engine replacement before the first printing. This case, however, is disadvantageous in that the order in which color toners are superposed is changed and thus the image quality may be impaired to some extent.

Described thus far is an example of an image forming apparatus that includes a movable paper exit tray 141, as described in FIG. 2, and that performs a second printing, after prompt replacement of image forming engines, with the movable paper exit tray 141 moving to the paper supplying position without a need for a user to supply a sheet to the apparatus again. However, the movable paper exit tray 141 may be omitted. The invention is also applicable to an image forming apparatus that performs a second printing while a sheet subjected to a first printing is received on the sheet tray 110 or on a manual-feeding tray, not illustrated.

Described thus far is an example where the present invention is applied to a so-called tandem image forming apparatus illustrated in FIG. 2. However, the present invention is directly applicable to a so-called rotary image forming apparatus that includes a device in which multiple engines are loaded and that rotates the device for printing.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus, comprising:
   a plurality of individually replaceable image forming assemblies forming images of different colors;
   a storage portion that stores a time point at which at least one of image forming assemblies currently loaded into the apparatus is unloaded;
   a calculating portion that calculates an unloaded-engine storage period, which is time elapsed from a time point at which a newly loaded image forming assembly is unloaded last time to a time point at which the image forming assembly is newly loaded; and
   a controller that performs image quality adjustment depending on the unloaded-engine storage period calculated by the calculating portion before the newly loaded image forming assembly is used for image formation,
   wherein the apparatus receives an input of image data of an image that contains a color other than colors of currently loaded image forming assemblies, and
   wherein the apparatus forms a final image based on the image data on a sheet through a plurality of image forming operations on the same sheet while at least one of the image forming assemblies loaded into the apparatus is replaced.

2. The image forming apparatus according to claim 1, wherein the controller performs image quality adjustment, in response to loading of the newly loaded image forming assembly, on only the newly loaded image forming assembly among all the image forming assemblies loaded into the image forming apparatus.

3. The image forming apparatus according to claim 1,
   wherein the storage portion stores a time point at which previous image formation on a sheet has been performed,
   wherein the calculating portion calculates an intermediate-image storage period, which is time elapsed from the time point at which the previous image formation on the same sheet has been performed to a time point at which current image formation on the same sheet is to be performed, and
   wherein the controller adjusts image forming conditions in the current image formation on the same sheet depending on the intermediate-image storage period calculated by the calculating portion.

4. The image forming apparatus according to claim 2,
   wherein the storage portion stores a time point at which previous image formation on a sheet has been performed,
   wherein the calculating portion calculates an intermediate-image storage period, which is time elapsed from the time point at which the previous image formation on the same sheet has been performed to a time point at which current image formation on the same sheet is to be performed, and
   wherein the controller adjusts image forming conditions in the current image formation on the same sheet depending on the intermediate-image storage period calculated by the calculating portion.

* * * * *